(12) United States Patent
Li

(10) Patent No.: US 10,621,641 B2
(45) Date of Patent: Apr. 14, 2020

(54) METHOD AND DEVICE FOR PUSHING INFORMATION

(71) Applicant: TENCENT TECHNOLOGY (SHENZHEN) COMPANY LIMITED, Shenzhen, Guangdong (CN)

(72) Inventor: Shaobo Li, Guangdong (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 1197 days.

(21) Appl. No.: 14/242,498

(22) Filed: Apr. 1, 2014

(65) Prior Publication Data

US 2014/0214621 A1 Jul. 31, 2014

Related U.S. Application Data

(63) Continuation of application No. PCT/CN2013/088983, filed on Dec. 10, 2013.

(30) Foreign Application Priority Data

Jan. 17, 2013 (CN) .......................... 2013 1 0016796

(51) Int. Cl.
*G06Q 30/00* (2012.01)
*G06Q 30/06* (2012.01)
*G06Q 30/02* (2012.01)

(52) U.S. Cl.
CPC ..... *G06Q 30/0625* (2013.01); *G06Q 30/0251* (2013.01)

(58) Field of Classification Search
CPC .............................................. G06Q 30/00–08
See application file for complete search history.

(56) References Cited

U.S. PATENT DOCUMENTS

2002/0077931 A1* 6/2002 Henrion ................. G06Q 30/02
707/713
2006/0041548 A1* 2/2006 Parsons ............. G06F 17/30873
(Continued)

FOREIGN PATENT DOCUMENTS

CN 101079710 A 11/2007
CN 102063433 A 5/2011
(Continued)

OTHER PUBLICATIONS

Context-Aware Recommender Systems. Adomavicius, Gediminas; Mobasher, Bamshad; Ricci, Francesco; Tuzhilin, Alex. AI Magazine; La Canada vol. 32, Iss. 3, (Fall 2011): 67-80. Retreived via Proquest on Jul. 22, 2019. (Year: 2011).*

(Continued)

*Primary Examiner* — Michael Misiaszek
(74) *Attorney, Agent, or Firm* — Anova Law Group, PLLC

(57) ABSTRACT

A method for pushing information includes obtaining information of first commodity including the predetermined characteristic information selected by customers on an e-commerce website; obtaining information of second commodities with the same predetermined characteristic information as that of the first commodity; extracting at least two kinds of predetermined attribute information from each of the second commodities; pushing the information of second commodities with the same predetermined characteristic information as that of the first commodity according to the at least two kinds of predetermined attribute information, to make sure that the pushed information meets customers' requirements.

11 Claims, 5 Drawing Sheets

(56) References Cited

U.S. PATENT DOCUMENTS

2008/0033939 A1* 2/2008 Khandelwal ...... G06F 17/30707
2013/0262979 A1* 10/2013 Gu .................... G06F 17/30873
715/234

FOREIGN PATENT DOCUMENTS

CN  102567899 A  7/2012
CN  102722524 A  10/2012

OTHER PUBLICATIONS

Improved Collaborative Filtering Recommendation Algorithm Based on Weighted Association Rules. Yang, Hai. Applied Mechanics and Materials; Zurich vol. 411-414, (Sep. 2013): 94. Retrieved via ProQuest on Jul. 22, 2019. (Year: 2013).*

Hybrid approaches to product recommendation based on customer lifetime value and purchase preferences Liu, Duen-Ren; Shih, Ya-Yueh. Journal of Systems and Software vol. 77, Iss. 2, (Aug. 2005): 181-191. (Year: 2005).*

International Search Report issued in corresponding International Application No. PCT/CN2013/088983, dated Mar. 20, 2014.

The State Intellectual Property Office of the People's Republic of China (SIPO) Office Action 1 for 201310016796.5 dated Jan. 8, 2018 7 Pages (including translation).

* cited by examiner

METHOD AND DEVICE FOR PUSHING INFORMATION

CROSS REFERENCE TO RELATED APPLICATIONS

The present application is a continuation application of PCT Patent Application No. PCT/CN2013/088983, filed on Dec. 10, 2013, which claims the benefit of priority to China patent application NO. 201310016796.5 filed in the Chinese Patent Office on Jan. 17, 2013 and entitled "METHOD AND DEVICE FOR PUSHING INFORMATION", the content of which is hereby incorporated by reference in its entirety.

FIELD OF THE TECHNICAL

The disclosure relates to the field of Internet technology, and particularly to a method and device for pushing information.

BACKGROUND

The section provides background information related to the present disclosure which is not necessarily prior art.

With the expansion of network services, more and more e-commerce websites provide a plurality of sale commodity information for buyers. Meanwhile, as the number and types of the sale commodity information sold increasing, it is difficult for the buyer to find their favorite commodities in a short time when purchasing commodities. Given this, a conventional information push way is adopted to push commodity information for the buyers. That is, the commodity information browsed by the buyers is recorded by the e-commerce website. When the buyers login the e-commerce website again, a plurality of commodity information of which commodity categories similar to the commodity categories of the recorded commodity information is pushed to the buyers. However, the accuracy of the conventional way of information pushing needs to be proved. That is, the commodities whose information is pushed by the conventional way of information pushing are too many, and a plurality of commodity information fails to meet the requirement of the buyers. Therefore, it is still difficult for buyers to find their favorite commodity information in a short time.

SUMMARY

The disclosed method and device for pushing information are directed to solve one or more problems set forth above and other problems.

This section provides a general summary of the disclosure, and is not a comprehensive disclosure of its full scope or all of its features.

Further areas of applicability will become apparent from the description provided herein. The description and specific examples in this summary are intended for purposes of illustration only and are not intended to limit the scope of the present disclosure.

A method for pushing information includes obtaining information of first commodity selected by a customer on an e-commerce website, wherein the information of first commodity includes predetermined characteristic information; obtaining information of second commodities with the same predetermined characteristic information as that of the information of first commodity; extracting at least two predetermined attribute information from each of the information of second commodities; pushing the information of second commodities with the same predetermined characteristic information as that of the information of first commodity according to the at least two predetermined attribute information.

A device for pushing information includes an obtaining module configured to obtain information of first commodity comprising predetermined characteristic information, and obtain information of second commodities with the same predetermined characteristic information as that of the information of first commodity; an extracting module configured to extract at least two predetermined attribute information from each of the information of second commodities; a push module configured to push the information of second commodities with the same predetermined characteristic information as that of the information of first commodity according to the at least two predetermined attribute information.

BRIEF DESCRIPTION OF THE DRAWINGS

In order to illustrate the embodiments or existing technical solutions more clearly, a brief description of drawings that assists the description of embodiments of the invention or existing art will be provided below. It would be apparent that the drawings in the following description are only for some of the embodiments of the invention. A person having ordinary skills in the art will be able to obtain other drawings on the basis of these drawings without paying any creative work.

DETAILED DESCRIPTION OF ILLUSTRATED EMBODIMENTS

Technical solutions in embodiments of the present invention will be illustrated clearly and entirely with the aid of the drawings in the embodiments of the invention. It is apparent that the illustrated embodiments are only some embodiments of the invention instead of all of them. Other embodiments, which are obtained by a person having ordinary skills in the art based on the illustrated embodiments of the present invention without paying any creative work, should all be within the protection scope of the present invention.

Figure 8:
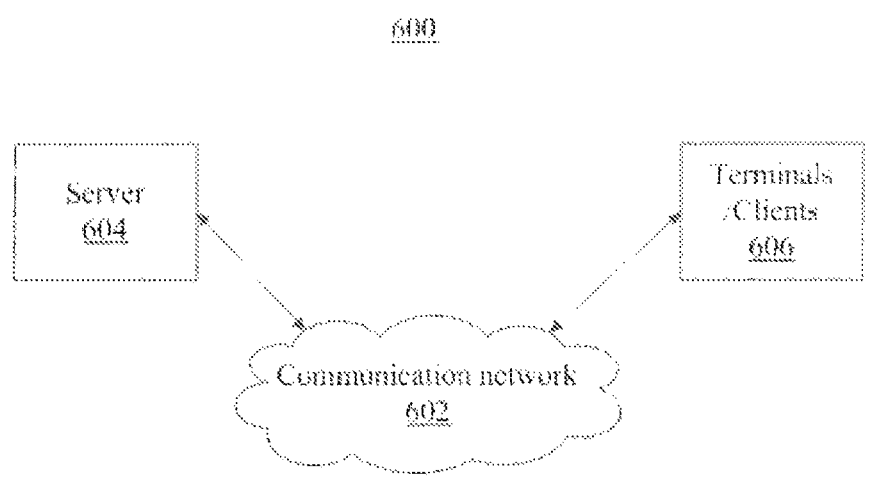
FIG. 8 depicts an exemplary environment incorporating certain disclosed embodiments.

FIG. 8 depicts an exemplary environment 600 incorporating exemplary methods and systems for pushing information in accordance with various disclosed embodiments. As shown in FIG. 8, the environment 600 can include a server 604, a terminal 606, and a communication network 602. The server 604 and the terminal 606 may be coupled through the communication network 602 for information exchange including, e.g., sending/receive commodity information, obtaining relevance commodity information, pushing relevance commodity information, etc. Although only one terminal 606 and one server 604 are shown in the environment 600, any number of terminals 606 or servers 604 may be included, and other devices may also be included.

The communication network 602 may include any appropriate type of communication network for providing network connections to the server 604 and terminal 606 or among multiple servers 604 or terminals 606. For example, the communication network 602 may include the Internet or other types of computer networks or telecommunication networks, either wired or wireless.

A terminal, as used herein, may refer to any appropriate user terminal with certain computing capabilities, e.g., a personal computer (PC), a work station computer, a handheld computing device (e.g., a tablet), a mobile terminal (e.g., a mobile phone or a smart phone), or any other client-side computing device.

A server, as used herein, may refer to one or more server computers configured to provide certain server functionalities, e.g., receiving commodity information, relevance commodity information obtaining, relevance commodity information processing, pushing relevance commodity information for users, etc. A server may also include one or more processors to execute computer programs in parallel.

Figure 9:
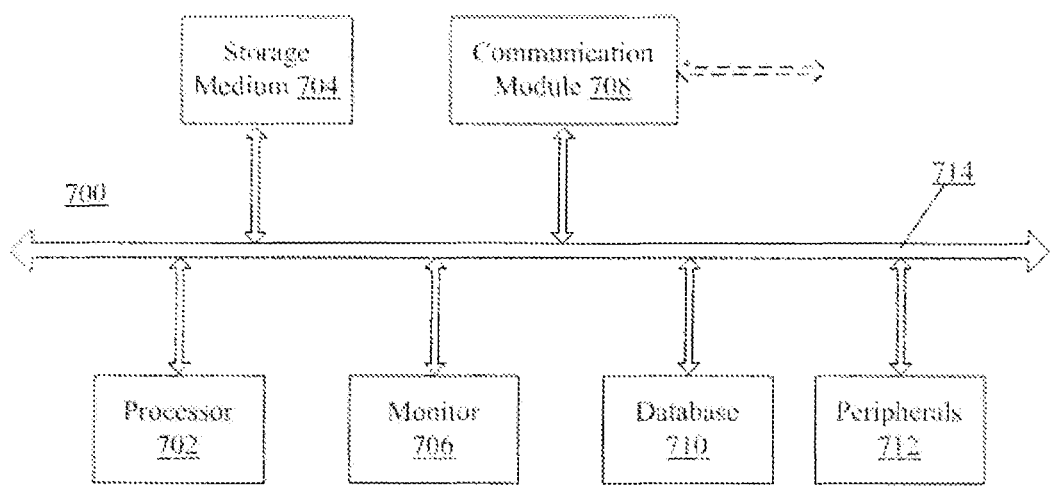
FIG. 9 depicts an exemplary computing system consistent with the disclosed embodiments.

The server 604 and the terminal 606 may be implemented on any appropriate computing platform. FIG. 9 shows a block diagram of an exemplary computing system 700 (or computer system 700) capable of implementing the server 604 and/or the terminal 606. As shown in FIG. 9, the exemplary computer system 700 may include a processor 702, a storage medium 704, a monitor 706, a communication module 708, a database 710, peripherals 712, and one or more bus 714 to couple the devices together. Certain devices may be omitted and other devices may be included.

The processor 702 can include any appropriate processor or processors. Further, the processor 702 can include multiple cores for multi-thread or parallel processing. The storage medium 704 may include memory modules, e.g., Read-Only Memory (ROM), Random Access Memory (RAM), and flash memory modules, and mass storages, e.g., CD-ROM, U-disk, removable hard disk, etc. The storage medium 704 may store computer programs for implementing various processes (e.g., receiving commodity information, processing relevance commodity information, etc.), when executed by the processor 702.

The monitor 706 may include display devices for displaying contents in the computing system 700, e.g., displaying pushed relevance commodity information or relevance commodity information interface. The peripherals 712 may include I/O devices such as keyboard and mouse.

Further, the communication module 708 may include network devices for establishing connections through the communication network 602. The database 710 may include one or more databases for storing certain data and for performing certain operations on the stored data, e.g., storing relevance commodity information, user IDs, and calculated recommendation index of the relevance commodity information, or any other suitable data searching and management operations.

In operation, the terminal 606 may cause the server 604 to perform certain actions, e.g., receiving commodity information from a user terminal, returning relevance commodity information, pushing relevance commodity information, etc. The server 604 may be configured to provide structures and functions for such actions and operations. More particularly, the server 604 may include a management server, a messaging server, a pushing server, or any other suitable servers for corresponding functions.

In various embodiments, a terminal involved in the disclosed methods and systems can include the terminal 606, while a server involved in the disclosed methods and systems can include the server 604. The methods and systems disclosed in accordance with various embodiments can be executed by a computer system. In one embodiment, the disclosed methods and systems can be implemented by a server.

Various embodiments provide methods and systems for processing report information. The methods and systems are illustrated in various examples described herein.

Figure 1:
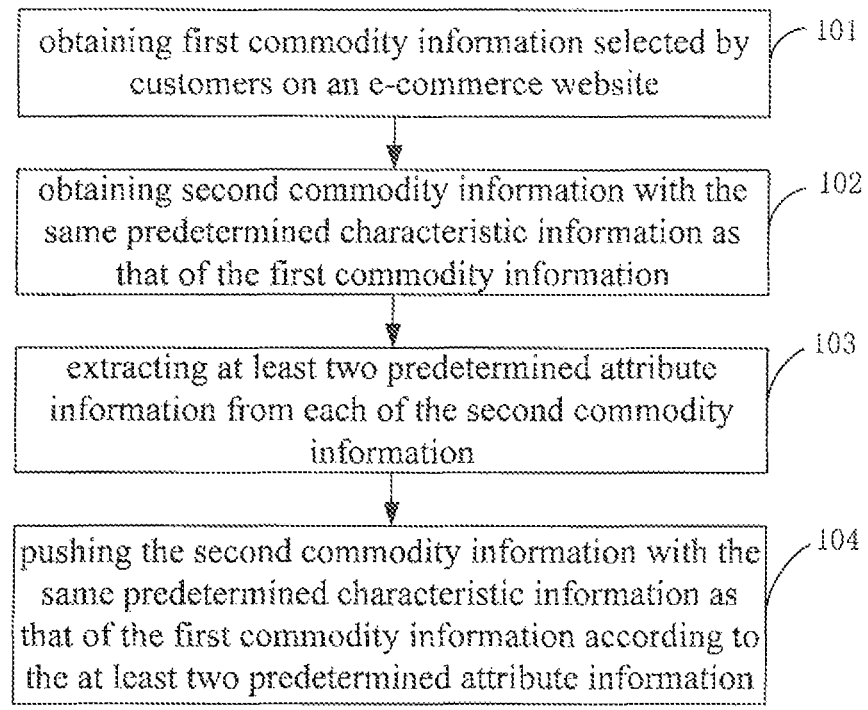
FIG. 1 is a flow chart of an example of a method for pushing information according to various embodiments.

Referring to FIG. 1, it is a flowchart of an example of a method for pushing information according to various embodiments. The method includes the following steps.

Step S101: obtaining information of first commodity selected by customers on an e-commerce website. The information of first commodity includes predetermined characteristic information.

Specifically, the e-commerce website selling commodities displays all kinds of commodity information for customers, such as commodity images, commodity detail description and so on. When a customer select a certain commodity to buy through the e-commerce website, the customer clicks a commodity image corresponding to the selected certain commodity, to trigger a server terminal corresponding to the e-commerce website to send the information of first commodity of the certain commodity. The information of first commodity includes the commodity characteristic information. For example, when the customer buys a smartphone through the e-commerce website, the customer clicks a preferred smartphone image displayed on the e-commerce website. The server terminal sends the smartphone information corresponding to the preferred smartphone. The smartphone information includes the smartphone characteristic information, such as model, category, color, and function of the smartphone.

Step S102: obtaining information of second commodities with the same predetermined characteristic information as that of the information of first commodity.

Specifically, the information of second commodities with the predetermined characteristic information is obtained from the server terminal according to the predetermined characteristic information. The predetermined characteristic information may be the lowest category of the commodity information. That is, that obtaining the information of second commodities with the predetermined characteristic information may be that obtaining the information of second commodities with the same lowest category as that of the information of first commodity. For example, a customer clicks a phone image on the e-commerce website. The lowest category of the phone corresponding to the clicked phone image may be "touchscreen smartphone" as a first minimum category. That is, the minimum category of the information of second commodities obtained from the server terminal may be the first minimum category.

Step S103: extracting at least two predetermined attribute information from each of the information of second commodities.

Specifically, the information of second commodities includes a number of the predetermined attribute information. In the embodiment, the predetermined attribute information may be inherent information of the information of second commodities, such as commodity comment information, commodity color information, commodity feature and cost information, commodity model information, and commodity function information.

Step 104: pushing the information of second commodities with the same predetermined characteristic information as that of the information of first commodity according to the at least two predetermined attribute information.

In the embodiment, the information of first commodity is selected by the customer through clicking the corresponding commodity image. The information of first commodity includes the predetermined characteristic information. The information of second commodities with the same predetermined characteristic information as that of the information of first commodity is obtained. The at least two predetermined attribute information are extracted from each of the information of second commodities. The information of second commodities with the same predetermined characteristic information as that of the information of first commodity is pushed according to the at least two predetermined attribute information, to make the pushed information of second commodities meets customers' requirements, which improves the accuracy of the information push.

Figure 2:
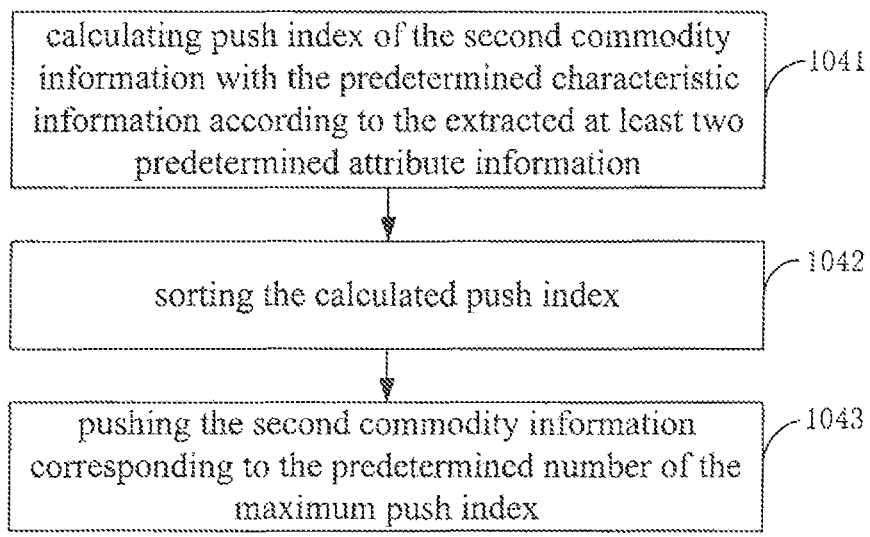
FIG. 2 is a flowchart of a certain step of FIG. 1.

Referring to FIG. 2, the step S104 may include the following steps.

Step S1041: calculating recommendation index of the information of second commodities with the predetermined characteristic information according to the extracted at least two predetermined attribute information.

Step S1042: sorting the calculated recommendation index.

Generally, the greater the calculated recommendation index is, the more the commodity corresponding to the calculated recommendation index meets customers' requirement.

Step S1043: pushing the information of predetermined number of second commodities corresponding to the maximum recommendation index.

Specifically, the step S1043 may includes displaying the information of predetermined number of second commodities corresponding to the maximum recommendation index.

Figure 3:
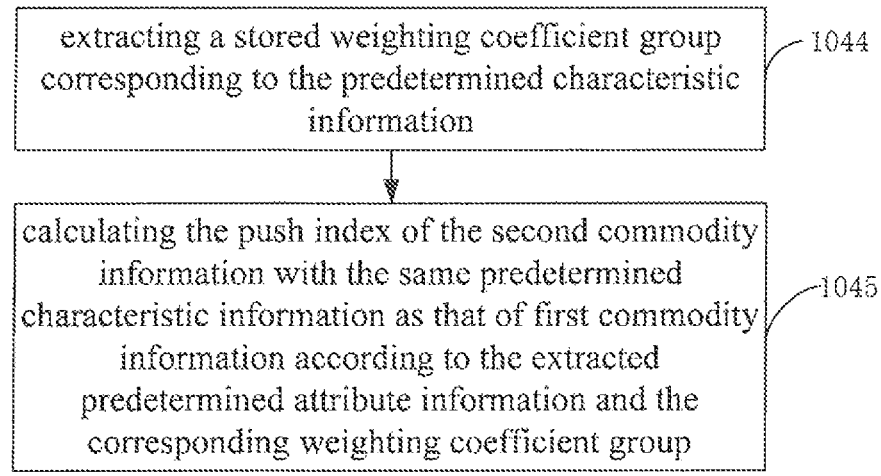
FIG. 3 is a flowchart of a certain step of FIG. 2.

Referring to FIG. 3, the step S1041 may include the following steps.

Step S1044: extracting a stored weighting coefficient group corresponding to the predetermined characteristic information.

Generally, owing to the commodities purchased by different customers are different, the requirements of the customers for the inherent information of the commodity information are different. Therefore, a plurality of weighting coefficient groups is predetermined according to the requirements of the customers for the inherent information of the commodity information. The inherent information of the commodity information may include commodity function information and commodity color information, and so on. For example, when the customers buy long-sleeved clothes, the commodity color information is paid greater attention to than the commodity function information. While, when the customers buy a touchscreen smartphone, the commodity function information is paid greater attention to than the commodity color information. Wherein, the lowest category of the touchscreen smartphone may be the first lowest category. The lowest category of the long-sleeve clothes may be second lowest category. Therefore, in the predetermined weighting coefficient group corresponding to the predetermined characteristic information which includes the second lowest category, a weighting coefficient of the commodity color information is greater than the weighting coefficient of the commodity function information. In the predetermined weighting coefficient group corresponding to the predetermined characteristic information which includes the first lowest category, a weighting coefficient of the commodity function information is greater than the weighting coefficient of the commodity color information.

Step S1045: calculating the recommendation index of the information of second commodities with the same predetermined characteristic information as that of information of first commodity according to the extracted predetermined attribute information and the corresponding weighting coefficient group.

Figure 4:
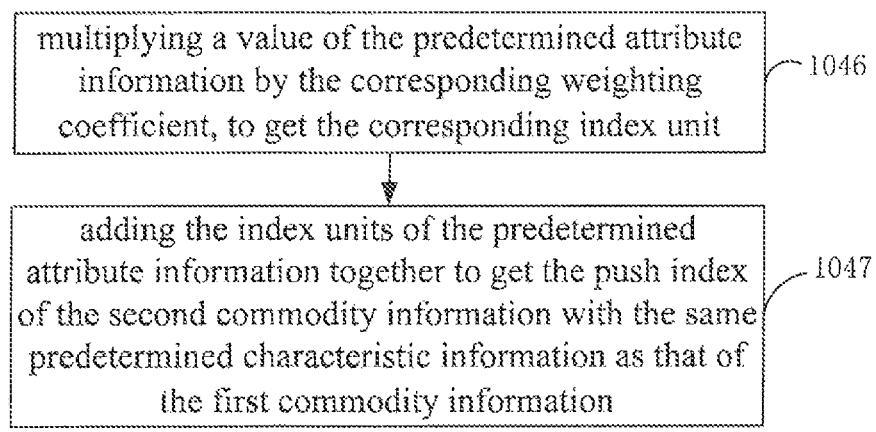
FIG. 4 is a flowchart of a certain step of FIG. 3.

Referring to FIG. 4, specifically, the step of calculating the recommendation index of the information of second commodities may include the following steps.

Step S1046: multiplying a value of the predetermined attribute information by the corresponding weighting coefficient, to get the corresponding index unit.

Specifically, each of the predetermined attribute information corresponds to each value.

Step S1047: adding the index units of the predetermined attribute information together to get the recommendation index of the information of second commodities with the same predetermined characteristic information as that of the information of first commodity.

For example, $$F = \sum_{j=1}^{n} \alpha i w i = \alpha 1 w 1 + \alpha 2 w 2 + \alpha 3 w 3 + \ldots + \alpha n w n;$$

wherein F denotes the recommendation index; $\alpha i$ denotes the value of the $i_{th}$, predetermined attribute; wi denotes the corresponding weighting coefficient of $\alpha i$; w1, w2, w3 ... wn denotes the weighting coefficient group, and $0 \le wi \le 1$; n denotes the number of the extracted predetermined attribute information of the commodity information.

In the embodiment, each of the predetermined characteristic information corresponds to one of the weighting coefficient groups. The value of the predetermined attribute information is used to be as a value of the inherent information of the information of second commodities. For example, the values of the inherent information may include a value of the commodity comment, a value of the feature and cost of commodity, a value of the commodity color, a value of the commodity function, and so on. Owing to the clicked information of second commodities by different customers on the e-commerce website are different, the requirements of the different customers for the inherent information of the information of second commodities are different. Therefore, the weighting coefficient group is predetermined according to the requirements of the customers for the inherent information of the commodity information. The inherent information of the commodity information may include the commodity function information, the commodity color information, and so on. For example, the customer needs to buy long-sleeve clothes through the e-commerce website. For the customer, the commodity color information may be paid greater attention to than the commodity function information. When the customer needs to buy a touchscreen smartphone, for the customer, the commodity function information may be paid greater attention to than the commodity color information. Wherein, the lowest category of the touchscreen smartphone may be the first lowest category. The lowest category of the long-sleeve information may be the second lowest category. Therefore, when the weighting coefficient group corresponding to the second lowest category is predetermined, the weighting coefficient corresponding to the value of the commodity color information may be greater than the weighting coefficient corresponding to the value of the commodity function information. When the weighting coefficient group corresponding to the second lowest category is predetermined, the weighting coefficient corresponding to the value of the commodity function information may be greater than the weighting coefficient corresponding to the value of the commodity color information. When the recommendation index is calculated, the values of a plurality of predetermined attribute information and the weighting coefficient corresponding to the plurality of predetermined attribute information need to be considered. Therefore, the greater the calculated recommendation index is, the more the commodity corresponding to the recommendation index meets customer's requirement.

In other embodiments, the weighting coefficient of the weighting coefficient group can be adjusted according to need and requirements of the customers for the commodity attribute information.

Figure 5:
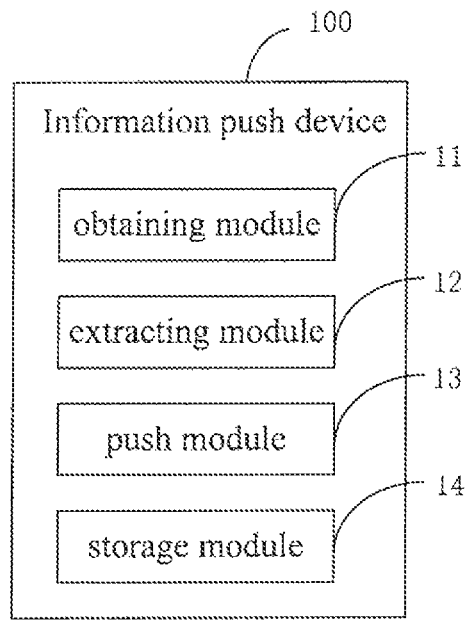
FIG. 5 is a block diagram of an example of a device for pushing information according to various embodiments, the device including push module and calculating module.
Figure 6:
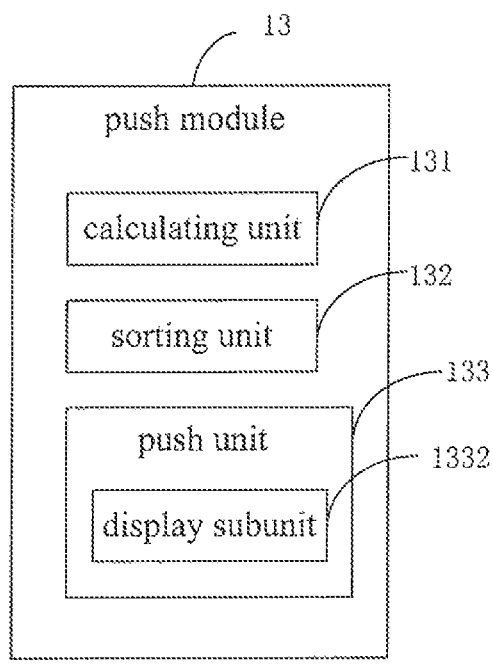
FIG. 6 is a block diagram of the push module of FIG. 5.
Figure 7:
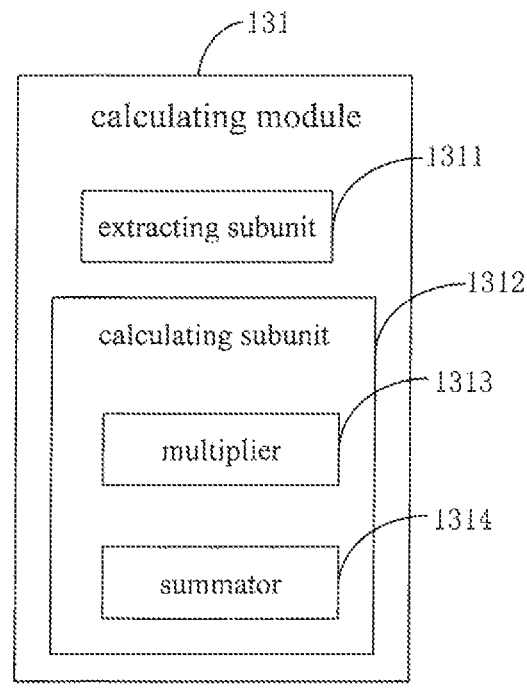
FIG. 7 is a block diagram of the calculating module of FIG. 6.

Referring to FIGS. 5 to 7, it is a block diagram of a device 100 for pushing information according to various embodiments. The device 100 includes an obtaining module 11, an extracting module 12, and a push module 13.

The obtaining module 11 is used to obtain information of first commodity selected by a customer on an e-commerce website. The information of first commodity includes predetermined characteristic information. The obtaining module 11 is further used to obtain information of second commodities with the same predetermined characteristic information as that of the information of first commodity.

Specifically, the e-commerce website selling commodities displays all kinds of commodity information for customers, such as commodity images, commodity detail description and so on. When a customer select a certain commodity to buy through the e-commerce website, the customer clicks a commodity image corresponding to the selected certain commodity, to trigger a server terminal corresponding to the e-commerce website to send the information of first commodity of the certain commodity. The information of first commodity includes the commodity characteristic information. For example, when the customer buys a smartphone through the e-commerce website, the customer clicks a preferred smartphone image displayed on the e-commerce website. The server terminal sends the smartphone information corresponding to the preferred smartphone. The smartphone information includes the smartphone characteristic information, such as model, category, color, and function of the smartphone.

The information of first commodity obtained by the obtaining module 11 includes the predetermined characteristic information. The obtaining module 11 obtains the information of second commodities with the predetermined characteristic information from the server terminal according to the predetermined characteristic information. In the embodiment, the predetermined characteristic information may be the lowest category of the commodity information. That is, that obtaining the information of second commodities with the predetermined characteristic information may be that obtaining the information of second commodities with the same lowest category as that of the information of first commodity. For example, a customer clicks a phone image on the e-commerce website. The lowest category of the phone corresponding to the clicked phone image may be a first minimum category "touchscreen smartphone". That is, the information of second commodities obtained from the server terminal includes the first minimum category.

The extracting module 12 is used to extract at least two predetermined attribute information from each of the information of second commodities.

Specifically, the information of second commodities includes a number of the predetermined attribute information. In the embodiment, the predetermined attribute information may be inherent information of the information of second commodities, such as commodity comment information, commodity color information, commodity feature and cost information, commodity model information, and commodity function information.

The push module 13 is used to push the information of second commodities with the same predetermined characteristic information as that of the information of first commodity according to the at least two predetermined attribute information.

In the embodiment, the device 100 obtains the obtaining module 11, the extracting module 12, and push module 13. The obtaining module 11 obtains the information of first commodity is selected by the customer. The information of first commodity includes the predetermined characteristic information. The obtaining module 11 obtains the information of second commodities with the same predetermined characteristic information as that of the information of first commodity. The extracting module 12 extracts the at least two predetermined attribute information from each of the information of second commodities. The push module 13 pushes the information of second commodities with the predetermined characteristic information according to the at least two predetermined attribute information. Therefore, the device 100 makes the pushed information of second commodities meets user's requirements, which improves the accuracy of the information push.

Referring to FIG. 6, the push module 13 may include a calculating unit 131, a sorting unit 132, and a push unit 133.

The calculating unit 131 is used to calculate recommendation index of the information of second commodities with the same predetermined characteristic information according to the extracted at least two predetermined attribute information.

The sorting unit 132 is used to sort the calculated recommendation index.

Generally, the greater the calculated recommendation index is, the more the commodity corresponding to the calculated recommendation index meets customers' requirement.

The push unit 133 is used to push the information of predetermined number of second commodities corresponding to the maximum recommendation index.

Further, the push unit 133 may includes a display subunit 1332. The display subunit 1332 is used to display the information of predetermined number of second commodities corresponding to the maximum recommendation index.

Referring to FIG. 7, the device 100 further includes a storage module 14. The storage module 14 is used to store a plurality of weighting coefficient groups corresponding to the predetermined characteristic information. The calculating module 131 may include an extracting subunit 1311 and a calculating subunit 1312.

The extracting subunit 1311 is used to extract the stored weighting coefficient group corresponding to the predetermined characteristic information.

Generally, owing to the commodities purchased by different customers are different, the requirements of the customers for the inherent information of the commodity information are different. Therefore, a plurality of weighting coefficient groups is predetermined according to the requirements of the customers for the inherent information of the commodity information. The inherent information of the commodity information may include commodity function information and commodity color information, and so on. For example, when the customers buy long-sleeved clothes, the commodity color information is paid greater attention to than the commodity function information. When the customers buy a touchscreen smartphone, greater attention will be paid to the commodity function information than to the commodity color information. Wherein, the lowest category of the touchscreen smartphone may be the first lowest category. The lowest category of the long-sleeve clothes may be second lowest category. Therefore, in the predetermined weighting coefficient group corresponding to the predetermined characteristic information including the second lowest category, a weighting coefficient of the commodity color information is greater than the weighting coefficient of the commodity function information. In the predetermined weighting coefficient group corresponding to the predetermined characteristic information including the first lowest category, a weighting coefficient of the commodity function information is greater than the weighting coefficient of the commodity color information.

In other embodiments, the weighting coefficients of the weighting coefficient group can be adjusted according to need and the requirements of the customers for the commodity attribute information.

The calculating subunit 1312 is used to calculate the recommendation index of the information of second commodities with the same predetermined characteristic information as that of information of first commodity according to the extracted predetermined attribute information and the corresponding weighting coefficient group.

Farther, the calculating subunit 1312 includes a multiplier 1313 and a summator 1314.

The multiplier 1313 is used to multiply a value of the predetermined attribute information by the corresponding weighting coefficient, to get the corresponding index unit.

Specifically, each of the predetermined attribute information corresponds to each value.

The summator 1314 is used to add the index units of the predetermined attribute information together, to get the recommendation index of the information of second commodities with the same predetermined characteristic information as that of the information of first commodity.

For example, $$F = \sum_{i=1}^{n} \alpha i w i = \alpha 1 w 1 + \alpha 2 w 2 + \alpha 3 w 3 + \ldots + \alpha n w n;$$

wherein F denotes the recommendation index; $\alpha i$ denotes the value of the predetermined attribute information; $w i$ denotes the weighting coefficient of $\alpha i$; $w1, w2, w3 \ldots wn$ denotes the weighting coefficient group, and $0 \leq w i \leq 1$; n denotes the number of the extracted predetermined attribute information of the commodity information.

In the embodiment, each of the predetermined characteristic information corresponds to one of the weighting coefficient groups. The value of the predetermined attribute information may be a value of the inherent information of the information of second commodities with the same predetermined characteristic information as that of the information of first commodity. For example, the values of the inherent information may include a value of the commodity comment, a value of the feature and cost of commodity, a value of the commodity color, a value of the commodity function, and so on. Owing to the clicked information of second commodities on the e-commerce website by different customers are different, the requirements of the different customers for the inherent information of the information of second commodities are different. Therefore, the weighting coefficient groups are predetermined according to the requirements of the different customers for the inherent information of the commodity information. The inherent information of the commodity information may include the commodity function information, the commodity color information, and so on. For example, the customer needs to buy long-sleeve clothes through the e-commerce website. For the customer, the commodity color information may be paid greater attention to than the commodity function information. When the customer needs to buy a touchscreen smartphone, for the customer, the commodity function information may be paid greater attention to than the commodity color information. Wherein, the lowest category of the touchscreen smartphone may be the first lowest category. The lowest category of the long-sleeve information may be the second lowest category. Therefore, when the weighting coefficient group corresponding to the second lowest category is predetermined, the weighting coefficient corresponding to the value of the commodity color information may be greater than the weighting coefficient corresponding to the value of the commodity function information. When the weighting coefficient group corresponding to the second lowest category is predetermined, the weighting coefficient corresponding to the value of the commodity function information may be greater than the weighting coefficient corresponding to the value of the commodity color information. When the recommendation index is calculated, the values of a plurality of predetermined attribute information and the weighting coefficient corresponding to the plurality of predetermined attribute information need to be considered. Therefore, the greater the calculated recommendation index is, the more the commodity corresponding to the recommendation index meets customer's requirement.

In the embodiment, the obtaining module 11 obtains the information of first commodity is selected by the customer. The information of first commodity includes the predetermined characteristic information. The obtaining module 11 further obtains the information of second commodities with the same predetermined characteristic information as that of the information of first commodity. The extracting module 12 extracts at least two predetermined attribute information from each of the information of second commodities. The push module 13 pushes the information of second commodities with the predetermined characteristic information according to the at least two predetermined attribute information, to make the pushed information of second commodities meets user's requirements, which improves the accuracy of the information push.

A person having ordinary skills in the art can realize that part or whole of the processes in the methods according to the above embodiments may be implemented by a computer program instructing relevant hardware. The program may be stored in a computer readable storage medium. When executed, the program may execute processes in the above-mentioned embodiments of methods. The storage medium may be a magnetic disk, an optical disk, a Read-Only Memory (ROM), a Random Access Memory (RAM), et al.

The above descriptions are some exemplary embodiments of the invention, and should not be regarded as limitation to the scope of related claims. A person having ordinary skills in a relevant technical field will be able to make improvements and modifications within the spirit of the principle of the invention. The improvements and modifications should also be incorporated in the scope of the claims attached below.

What is claimed is:

1. A method for pushing information of commodities recommended by a server, comprising:
displaying images and detail descriptions of a plurality of commodities on an e-commerce website logged in by a customer;
obtaining information of a first commodity selected by the customer on the e-commerce website, wherein the information of the first commodity includes predetermined characteristic information;
displaying characteristic information of the first commodity selected by the customer on a detailed information display interface of the e-commerce website;
obtaining information of second commodities with the same predetermined characteristic information as that of the information of the first commodity;
extracting information of at least two kinds of predetermined attribute information from the information of each of the second commodities;
extracting, from a plurality of weighting coefficient groups, a stored weighting coefficient group associated with the predetermined attribute information for commodities having the same characteristic information, wherein each predetermined characteristic information corresponds to one of the weighting coefficient groups, and the weighting coefficient groups are different for commodities having different characteristic information based on second commodity information previously clicked by the customer;
calculating a recommendation index of each of the second commodities with said predetermined characteristic information based on said information of at least two kinds of predetermined attribute information and corresponding weighting coefficient group;
sorting the calculated recommendation index to get a maximum recommendation index;
pushing information of a predetermined number of second commodities corresponding to said maximum recommendation index; and
after displaying the characteristic information of the first commodity selected by the customer on the detailed information display interface of the e-commerce website and in response to obtaining the pushed information, when detecting that the customer logs in to the e-commerce website again, transmitting and displaying, by the server, the predetermined number of the second commodities corresponding to the first commodity on a relevance commodity interface for user selection on the e-commerce website so that a number of user operations is reduced for a user to locate a relevant commodity that meet individual user requirements and corresponds to the first commodity.

2. The method according to claim 1, wherein calculating the recommendation index of each of the second commodities with said predetermined characteristic information comprises:
calculating index units by multiplying the value of one of said predetermined attribute information by the corresponding weighting coefficient of said weighting coefficient group and;
calculating said recommendation index of each of said second commodities by adding each index unit together.

3. The method according to claim 2, wherein a predetermined value of each of the predetermined attribute information is the value of the inherent information of the extracted information of said each of said second commodities.

4. The method according to claim 1, wherein the predetermined characteristic information is category information of the second commodity, and obtaining information of second commodities with the same predetermined characteristic information as that of said information of first commodity comprises obtaining the information of a second commodity which belongs to the same category with said first commodity.

5. A server for pushing information comprising a processor, which comprises a storage medium storing computer-executable instructions and a processor, wherein when executing the computer-executable instructions stored on the storage medium, the processor is configured to:
obtain information of a first commodity selected by a customer on an e-commerce website associated with the server, which comprises predetermined characteristic information, and obtaining information of second commodities with the same predetermined characteristic information as that of the first commodity, wherein images and detail descriptions of a plurality of commodities are displayed on the e-commerce website to obtain selection instruction of the first commodity;
extract information of at least two kinds of predetermined attribute information from each of the second commodities;
extract, from a plurality of weighting coefficient groups, a stored weighting coefficient group associated with the predetermined attribute information for commodities having the same characteristic information, wherein each predetermined characteristic information corresponds to one of the weighting coefficient groups, and the weighting coefficient groups are different for commodities having different characteristic information based on second commodity information previously clicked by the customer;
calculate a recommendation index of each of said second commodities with said predetermined characteristic information based on said information of at least two kinds of predetermined attribute information and corresponding weighting coefficient group;
sort said calculated recommendation index and get a maximum recommendation index; and
push the information of a predetermined number of second commodities with said maximum recommendation index; and after displaying the characteristic information of the first commodity selected by the customer on the detailed information display interface of the e-commerce website and in response to obtaining the pushed information, when detecting that the customer logs in to the e-commerce website again, transmit and display the predetermined number of the second commodities corresponding to the first commodity on a relevance commodity interface for user selection on the e-commerce website so that a number of user operations is reduced for a user to locate a relevant commodity that meet individual user requirements and corresponds to the first commodity.

6. The server of claim 5, wherein the processor is further configured to:

multiply the value of one of the predetermined attribute information by the corresponding weighting coefficient of said weighting coefficient group, to get a corresponding index unit; and add each index unit of said second commodities together, to get the recommendation index of each of the second commodities.

7. A non-transitory computer-readable storage medium storing computer program instructions executable by at least one processor to perform:

displaying images and detail descriptions of a plurality of commodities on an e-commerce website;

obtaining information of a first commodity selected by the customer on the e-commerce website, wherein the information of the first commodity includes predetermined characteristic information;

obtaining information of second commodities with the same predetermined characteristic information as that of the information of the first commodity;

extracting information of at least two kinds of predetermined attribute information from the information of each of the second commodities;

extracting, from a plurality of weighting coefficient groups, a stored weighting coefficient group associated with the predetermined attribute information for commodities having the same characteristic information, wherein each predetermined characteristic information corresponds to one of the weighting coefficient groups, and the weighting coefficient groups are different for commodities having different characteristic information based on second commodity information previously clicked by the customer;

calculating a recommendation index of each of the second commodities with said predetermined characteristic information based on said information of at least two kinds of predetermined attribute information and corresponding weighting coefficient group;

sorting the calculated recommendation index to get a maximum recommendation index;

pushing information of a predetermined number of second commodities corresponding to said maximum recommendation index; and after displaying the characteristic information of the first commodity selected by the customer on the detailed information display interface of the e-commerce website and in response to obtaining the pushed information, when detecting that the customer logs in to the e-commerce website again, transmitting and displaying the predetermined number of the second commodities corresponding to the first commodity on a relevance commodity interface for user selection on the e-commerce website so that a number of user operations is reduced for a user to locate a relevant commodity that meet individual user requirements and corresponds to the first commodity.

8. The storage medium according to claim 7, wherein calculating the recommendation index of each of the second commodities with said predetermined characteristic information comprises:

calculating index units by multiplying the value of one of said predetermined attribute information by the corresponding weighting coefficient of said weighting coefficient group and;

calculating said recommendation index of each of said second commodities by adding each index unit together.

9. The storage medium according to claim 8, wherein a predetermined value of each of the predetermined attribute information is the value of the inherent information of the extracted information of said each of said second commodities.

10. The storage medium according to claim 7, wherein the predetermined characteristic information is category information of the second commodity, and obtaining information of second commodities with the same predetermined characteristic information as that of said information of first commodity comprises obtaining the information of a second commodity which belongs to the same category with said first commodity.

11. The method according to claim 1, further comprising:
calculating the recommendation index based on the following equation $$F = \sum_{i=1}^{n} \alpha i w i = \alpha 1 w 1 + \alpha 2 w 2 + \alpha 3 w 3 + \ldots + \alpha n w n;$$

wherein F denotes the recommendation index; $\alpha i$ denotes value of ith predetermined attribute information; wi denotes a weighting coefficient of $\alpha i$, and $0 \leq w i \leq 1$; n denotes a number of the at least two kinds of predetermined attribute information.

* * * * *